Sept. 29, 1936.  H. D. KROLL  2,055,903
LOCKING MEANS FOR MULTIPLE FASTENER SLIDERS
Filed July 27, 1934
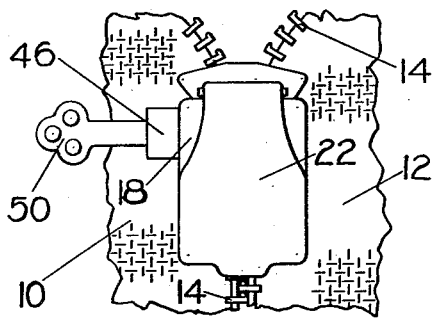
Fig. 1
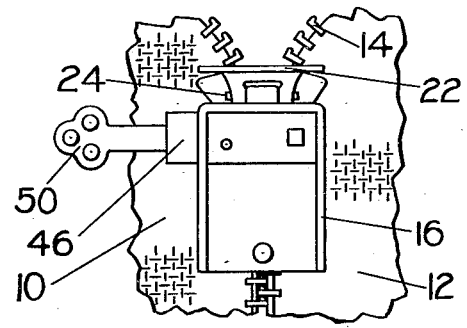
Fig. 2
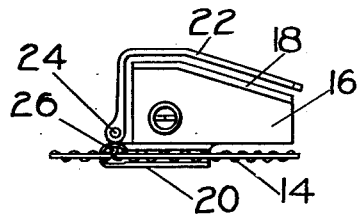
Fig. 3
Fig. 4
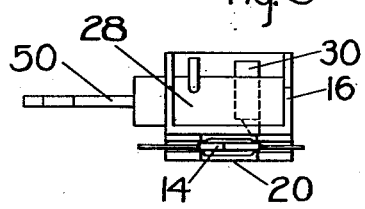
Fig. 5
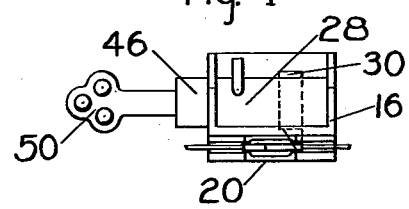
Fig. 6
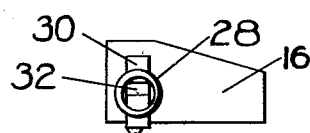
Fig. 7
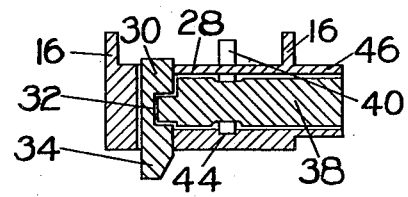
Fig. 8
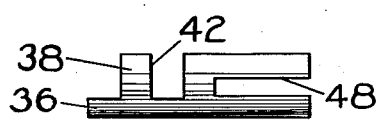
Fig. 9
INVENTOR.
HARRY DAVID KROLL
BY
ATTORNEYS.

Patented Sept. 29, 1936

2,055,903

UNITED STATES PATENT OFFICE 2,055,903

LOCKING MEANS FOR MULTIPLE FASTENER SLIDERS

Harry David Kroll, Los Angeles, Calif.

Application July 27, 1934, Serial No. 737,254

9 Claims. (Cl. 24—205)

This invention relates to an improved locking means for multiple fastener sliders of a type common on the market and has for one of its principal objects a provision of means whereby a slider for such a fastener construction may be positively and securely locked in position thereby insuring against unauthorized opening of the container with which such fastener is equipped.

One of the principal objects of this invention is the provision in a multiple fastener construction of a key-operated locking means for the fastener slider which will be simple in construction, effective in operation but which shall at the same time secure against unauthorized or illegal operation or opening thereof.

Another and further important object of the invention is to provide a double locking means for a fastener installation of this type, one of which locking means shall be adapted for merely manual operation, while the other is constructed so that only a key or some similar device will allow of the opening or locking thereof.

Other and further important objects of the invention will be apparent from the disclosures in the accompanying drawing and following specifications.

In the drawing:

Figure 1 is a top plan view of the improved multiple fastener locking means of this invention.

Figure 2 is a view similar to Fig. 1 showing the first fastening means in unlocking position and with cover removed from the second fastening or locking means.

Figure 3 is a side elevation of the device showing same in locked position.

Figure 4 is a view similar to Fig. 3 showing the apparatus in unlocked position.

Figure 5 is an end view of the key-operated locking means showing the same in free or open position.

Figure 6 is a view similar to Fig. 5, showing this portion of the apparatus in locking position.

Figure 7 is a detail view part in section of the principal key-operated locking element and its associated parts.

Figure 8 is a sectional view of the main portions of the key-operated locking device showing the same in locked or closed position.

Figure 9 is a side elevation of the key-operated locking element or cam.

As shown in the drawing:

The reference numerals 10 and 12 indicate general portions of a pair of stringers or adjacent parts of a container or other object, the edges of which stringers are equipped with a series of multiple fastener elements 14 such as those generally known and used. A slider 16 is applied to the rows of adjacent fastener elements 14, this slider being in the form of a box casing as best shown in Figs. 1 to 6 inclusive and which is equipped with a cover 18 as illustrated in Figs. 3 and 4. The usual cooperating fastener locking means 20 is positioned beneath the slider 16 in well known relationship therewith.

Pivotally mounted adjacent the forward portion of the slider casing 16 is a locking tab or the like 22 as best shown in Figs. 1, 3 and 4. This device is shaped as shown and is positioned on a pivot pin 24 for rotative movement about the same. The locking tab 22 is provided with a pair of integral extensions or locking elements 26 each of which, when the tab 22 is in lowermost position as shown in Figs. 1 and 3 will be forced between two adjacent fastener elements 14 and in that manner will prevent any slidable or locking or unlocking movement of the slider casing 16 and its associated part 20. Upon the tab 22 being pulled upwardly into the position shown in Fig. 4, the extensions 26 will be moved from their locking relationship with the elements 14 thereby again permitting a free movement of the slider device on the fastener.

Mounted within the housing 16 is a cylindrical element 28 which may or may not be integral therewith and positioned inside the cylinder 28 is another locking element 30 adapted for vertical movement with relation thereto.

As best shown in Figs. 5 and 6 this locking element 30 has a lowermost extension 34 which is adapted to penetrate between two of the fastener elements 14 when it is pushed downward and thereby lock the slider in position.

This locking element 30 has a slot 32 cut into one face thereof as shown in Figs. 7 and 8 and a projection 36 of the cam like locking element 38 fits into the slot 32, this projection 36 being eccentric with relation to the axis of rotation of the element 38 whereby rotative movement of the cam structure 38 will force the locking pin 30 upwardly or downwardly as desired.

The cylindrical cam 38 is close fitted in the housing 28 and is maintained in desired relationship therewith by means of a locking pin 40 which passes through the upper shell of the cylinder 28 through a slot or restricted portion 42 in the element 38 and thence into a suitable recess 44 provided therefor in the interior lower face of cylinder 28 or the bottom part of the casing 16 as the case may be.

The cylinder 28 is provided with an outwardly projecting tubular extension 46 preferably forming part of the casing 16 and the end of the cylindrical cam structure 38 is flush with the outer edges of this projection.

A key-receiving slot is provided in the cam structure 38 as best shown in Fig. 9, this being adapted for the insertion of the operating end of a key 50 thereinto. These keys and associated parts of the cam cylinder 38 may be made for individual fittings or requirements as is well known in the art.

It will be seen that herein is provided a simple yet positive and effective locking means for structures such as brief cases or other containers or every other article equipped with slider fastening means such as described. The double lock construction will balk the efforts of any ordinary thief or the like and the fact that a key is necessary for unlocking operation will render devices equipped with such a structure quite secure against such contingencies. Furthermore the device is compact while still being durable and being composed of a minimum of parts is not likely to get out of order. Furthermore it can be readily and easily operated by the owner or anyone else possessed of a key or acquainted with the method of use.

I am aware that many changes may be made and numerous details of construction varied throughout a wide range without departing from the principles of this invention and I therefore do not purpose limiting the patent granted hereon otherwise than as necessitated by the prior art.

I claim as my invention:

1. A slider for a multiple operated fastener, comprising a slider body, a duplex locking device on said slider body including a manually operated securing means and a key operated securing means, said key operated means comprising a casing on the slider and a latch mounted for vertical movement in the casing into and out of locking relationship with the fastener elements and a key rotated cam for moving said latch, a cylindrical housing for the latch and cam, said housing forming part of the slider casing and means for retaining the latch and cam in assembled relationship in the housing.

2. A slider for a multiple operated fastener, comprising a slider body, a duplex locking device on said slider body including a manually operated securing means and a key operated securing means, said key operated means comprising a casing on the slider and a latch mounted for vertical movement in the casing into and out of locking relationship with the fastener elements and a key rotated cam for moving said latch, a cylindrical housing for the latch and cam, said housing forming part of the slider casing and means for retaining the latch and cam in assembled relationship in the housing, said means comprising a fixed pin.

3. A slider for a multiple operated fastener, comprising a slider body, a duplex locking device on said slider body including a manually operated securing means and a key operated securing means, said key operated means comprising a casing on the slider and a latch mounted for vertical movement in the casing into and out of locking relationship with the fastener elements and a key rotated cam for moving said latch, a cylindrical housing for the latch and cam, said housing forming part of the slider casing and means for retaining the latch and cam in assembled relationship in the housing, said means comprising a fixed pin passing through the cylinder walls and passing into a slot formed in the cam cylinder.

4. A slider for a multiple operated fastener, comprising a slider body, a duplex locking device on said slider body including a manually operated securing means and a key operated securing means, said key operated means comprising a casing on the slider and a latch mounted for vertical movement in the casing into and out of locking relationship with the fastener elements and a key rotated cam for moving said latch, a cylindrical housing for the latch and cam, said housing forming part of the slider casing and means for retaining the latch and cam in assembled relationship in the housing, said means comprising a fixed pin passing through the cylinder walls and passing into a slot formed in the cam cylinder, said cam cylinder being provided with a notch in its outer end for the reception of the operating end of a key.

5. A slider for a multiple operated fastener, comprising a slider body, a duplex locking device on said slider body including a manually operated securing means and a key operated securing means, said key operated means comprising a casing on the slider and a latch mounted for vertical movement in the casing into and out of locking relationship with the fastener elements and a key rotated cam for moving said latch, a cylindrical housing for the latch and cam, said housing forming part of the slider casing and means for retaining the latch and cam in assembled relationship in the housing, said latch having a slot formed transversely in the face thereof and an eccentric projection on one end of the key rotated cam mounted in said slot.

6. A slider for a multiple operated fastener, comprising a slider body, a duplex locking device on said slider body including a manually operated securing means and a key operated securing means, said key operated means comprising a casing on the slider and a latch mounted for vertical movement in the casing into and out of locking relationship with the fastener elements, a key rotated cam for moving said latch, a cylindrical housing for the latch and cam, said housing forming part of the slider casing and means for retaining the latch and cam in assembled relationship in the housing, said means comprising a locking pin in the housing and contacting the key-rotated cam, said latch having a slot formed transversely in the face thereof and an eccentrically mounted projection on the end of the key-rotated cam mounted in said slot.

7. A slider for a multiple operated fastener, comprising a slider body, a duplex locking device on said slider body including a manually operated securing means and a key operated securing means, said key operated means comprising a casing on the slider, a latch mounted for vertical movement in the casing into and out of locking relationship with the fastener elements, a key rotated cylindrical cam for moving said latch, a cylindrical housing for the latch and cam, said housing forming part of the slider casing and means for retaining the latch and cam in assembled relationship in the housing, said latch having a slot formed transversely in the face thereof and a projection eccentrically mounted on one end of the key-rotated cam mounted in said slot, said cam cylinder being provided with a notch in its outward end for the reception of the operating end of a key.

8. A slider for a multiple operated fastener, comprising a slider body, and a duplex locking device on said slider body including a manually operated securing means and a key operated securing means, said key operated means comprising a casing on the slider and a latch mounted for vertical movement in the casing into and out of locking relationship with the fastener elements and a key rotated cam for moving said latch, a cylindrical housing for the latch and cam, said housing forming part of the slider casing and means for retaining the latch and cam in assembled relationship in the housing, said means comprising a fixed pin passing through the cylinder walls and passing into a slot formed in the cam cylinder, together with means for retaining said locking pin in position.

9. A slider for a multiple operated fastener, comprising a slider body, and a duplex locking device on said slider body including a manually operated securing means and a key operated securing means, said key operated means comprising a casing on the slider and a latch mounted for vertical movement in the casing into and out of locking relationship with the fastener elements and a key rotated cam for moving said latch, a cylindrical housing for the latch and cam, said housing forming part of the slider casing and means for retaining the latch and cam in assembled relationship in the housing, said means comprising a fixed pin passing through the cylinder walls and passing into a slot formed in the cam cylinder, together with means for retaining said locking pin in position, said means including a cover for the casing.

HARRY DAVID KROLL.